United States Patent [19]

Fuchs et al.

[11] 4,317,694
[45] Mar. 2, 1982

[54] LAMINATE APPLYING MACHINE AND METHOD

[75] Inventors: Gilbert Fuchs; Norman Crowley; Randall W. Wink, all of Evansville, Ind.

[73] Assignee: Evana Tool & Engineering Company, Evansville, Ind.

[21] Appl. No.: 181,698

[22] Filed: Aug. 27, 1980

[51] Int. Cl.³ .............................................. B32B 31/00
[52] U.S. Cl. .................................. 156/256; 156/269; 156/297; 156/521; 156/556; 198/774
[58] Field of Search ............... 156/256, 269, 285, 297, 156/510, 521, 556, 405 R, DIG. 11, DIG. 40, 538, 539; 198/774

[56] References Cited

U.S. PATENT DOCUMENTS

| | | | |
|---|---|---|---|
| 1,466,029 | 8/1923 | Peters | 198/774 |
| 2,026,172 | 12/1935 | Holm | 198/774 |
| 3,508,993 | 4/1970 | Belcher et al. | 156/285 X |
| 4,003,780 | 1/1977 | Cohn | 156/519 |
| 4,191,605 | 3/1980 | Katterheinrich et al. | 156/297 |
| 4,233,331 | 11/1980 | Lemke et al. | 156/521 X |

*Primary Examiner*—John E. Kittle
*Attorney, Agent, or Firm*—Larson and Taylor

[57] ABSTRACT

Apparatus and method for applying an adhesive laminate to a plate are disclosed. In a preferred embodiment, the invention comprises a cylindrical drum having a circular periphery of a porous material, a connection for applying a vacuum to the interior of the drum, and a laminate supplying assembly to supply an adhesive laminate, adhesive side outward, to the periphery of the drum where it is securely retained in place by the vacuum. A cutter assembly cuts the laminate into a segment having a desired length which is then positioned in place by a rotation of the drum. A walking beam conveyor conveys individual plates onto a vertically movable platform located at an operating station. The platform is then raised to contact an end of the plate with an end of the positioned laminate segment and then is lowered to an intermediate position so as to remove only the end of the segment adhering to the plate from the drum. A roller assembly then rolls the laminate segment onto the plate.

20 Claims, 16 Drawing Figures

LAMINATE APPLYING MACHINE AND METHOD

FIELD OF THE INVENTION

The present invention generally relates to a method and machine for applying a lamina to a substrate, and more particularly relates to a method and machine for applying an adhesive laminate to a plate without creating any wrinkles or leaving any air pockets in the finished product.

BACKGROUND OF THE INVENTION

There is need in the medical field for equipment which will rapidly produce clear plastic plates containing a plurality of pockets for carrying out various chemical reactions. In practice, body fluids are injected into the pockets which contain various chemicals and the color of the reaction between these chemicals and the body fluid is read to determine various body conditions. The plates with pockets and passageways therein may be molded of clear plastic with little difficultly. However, it is essential that a clear plastic cover be laid down over the faces of each plate to completely enclose the pockets in the plate. Obviously the clear plastic must be very precisely laid down in a wrinkle free condition so that the color chemical reactions in the pockets of the plate may be accurately read through the cover. Heretofore a clear plastic tape having adhesive on one face thereof has been used to provide covers for each side of the plastic plate.

A prior art method and machine, described in greater detail in the detailed description of the preferred embodiment section of the application, utilized a hexagonal wheel having an adhesive laminate strip on some of the sides thereof. The laminate was applied to the plate in a stamping motion. The adhesive laminate was fed to the hexagonal wheel at the first location, was cut into strips at a second location after the wheel had indexed, and was applied to the plate at a third location by moving the plate upwardly to contact the wheel positioned thereabove. The plate was then turned over and the process repeated for the other side. With this particular machine operating at its best speed, approximately twenty-five plate sides can be done per minute.

The aforedescribed machine had a number of disadvantages. Besides being relatively slow, and besides causing wrinkles or trapped air bubbles in the second laminate application step, the aforedescribed machine also had problems with accurately locating the laminate and the plate. Often, the machine would not be properly adjusted and would apply too much pressure to the plate. In addition, the prior art machine used a vacuum to hold the laminate to the wheel as it indexed around. The hexagonal wheel was comprised of blocks of tool steel having bores drilled therethrough so that the vacuum could be applied to the periphery of the wheel. This resulted in a non-uniform vacuum being applied across the face of the adhesive laminate. Consequently, the laminate sometimes slipped, could not be properly and accurately held in position, and was prone to becoming wrinkled.

While the prior art machine produced generally acceptable results to plates that were evaluated or read manually, it did not produce a sufficiently satisfactory product that could be read by a computer. The air bubbles and wrinkles, oftentimes minute, often produced incorrect readings by the computer.

SUMMARY OF THE INVENTION

The present invention overcomes the aforementioned disadvantages and the difficulties of the prior art device and method. More particularly, the present invention can more rapidly apply the laminate to the plate than the prior art device with a far greater accuracy and produce far fewer objects. In addition, the present machine is all mechanical utilizing a relatively simple motor and belt power transmission system for moving all of the components in a timed sequence. The present invention wipes the adhesive laminate onto the plate, thereby pushing the air out ahead of the contact line. With the present invention, the adhesive laminate can be more accurately positioned onto a new type of wheel and can be more accurately applied to the plate because the plate is brought into contact with only an end portion of the tape.

Thus, a device in accordance with the present invention is faster, more reliable, less expensive to manufacture and to operate, more efficient and accurate, and simpler in construction and operation.

An apparatus in accordance with the present invention comprises a rotatable drum means comprising a cylindrical drum and a means for applying a vacuum to the drum so as to retain a laminate on the outer periphery thereof. A supply means supplies the adhesive laminate to the periphery of the cylindrical drum, adhesive side outward. A positioning means comprising a movable platform and a platform moving means accurately contacts a plate supported on the top of the platform into contact with a laminate on the drum solely with an end of an upper side of the plate along a tangential area of the laminate. A roller means engages the laminate and the plate and rolls the laminate from the plate contacting end to the other end during a relative movement between the roller means and the plate.

The method according to the present invention applies an adhesive laminate onto an elongate plate by feeding an adhesive laminate, adhesive side out, to an operative conforming position on a convex surface and feeding a plate to an operative position on a movable platform. The platform is then moved to position only the upper side of one end of the plate into contact along a tangential area with the laminate. The laminate is then rolled from the contact area to the other end of the plate into an adhesive planar contact therewith.

In accordance with one specific embodiment of the present invention, the cylindrical drum includes a circular wall comprised of a porous material. In this specific embodiment, the adhesive laminate can be more accurately positioned onto the outer periphery of the drum and more securely retained thereon because the vacuum is applied more evenly along the entire face of the laminate.

Other features, objects, and advantages of the present invention will be discussed in or are apparent from the detailed description of the presently preferred embodiment of the invention located hereinbelow.

DETAILED DESCRIPTION OF THE PREFERRED EMBODIMENTS

Figure 1:
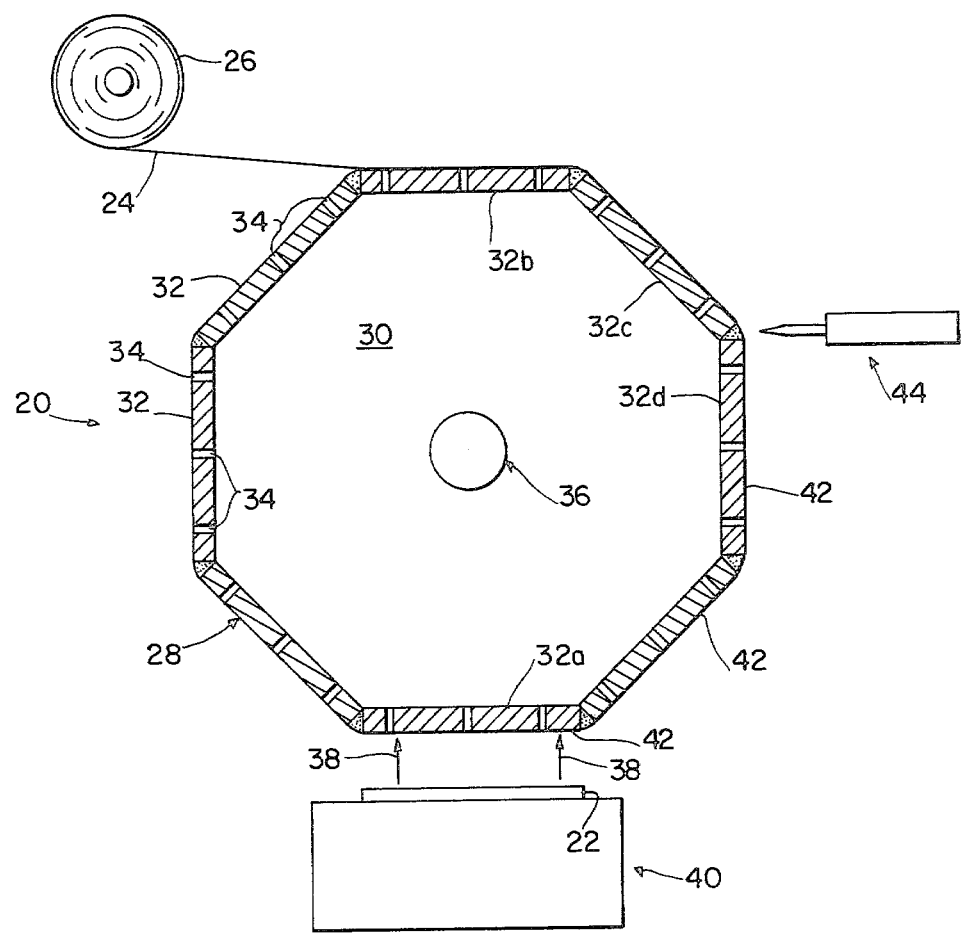
FIG. 1 is a schematic front elevational view of a prior art walking beam machine for applying an adhesive laminate to a plate.
Figure 2:
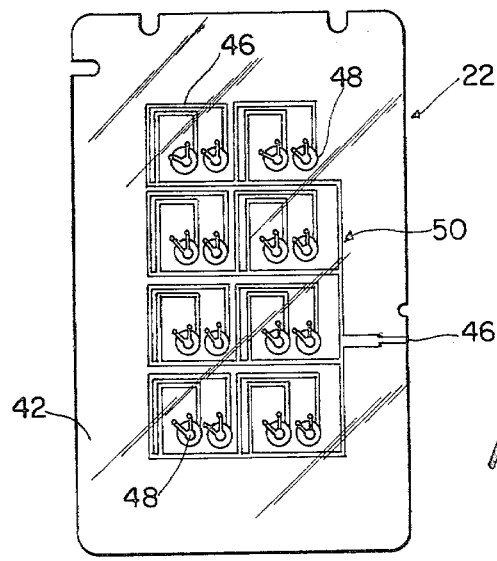
FIG. 2 is a plan view of a plate onto which the adhesive laminate is applied.

With reference to FIGS. 1 and 2, a prior art machine 20 for applying an adhesive laminate to a plate and an exemplary embodiment of such a plate 22 are respectively depicted. An adhesive laminate 24 is obtained commercially wound on a reel 26. The laminate is fed by a feeding means, not shown, to contact a hexagonal drum 28. Drum 28 is comprised of end plates 30 (only one of which is shown) and a hexagonal body comprised of six blocks 32 of tool steel having a plurality of holes or bores 34 drilled completely therethrough. The blocks 32 are sealingly connected to adjacent blocks, such as being welded thereto, and are all sealingly connected to end plates 30. Hexagonal drum 28 is mounted for intermittent, rotational movement about a supporting axis 36. A vacuum is applied through a connection (not shown) to the interior of drum 28. Located directly below drum 28 is a conveyor means 40 having a plate 22 positioned thereon immediately below the bottommost drum block 32a. Plate 22 is adapted to be moved vertically into contact with drum 28.

Laminate 24 contacts drum 28 at the uppermost block 32b. Block 32b is rotated to a cutting position, now occupied by block 32c, where the laminate is cut into laminate segments 42 by a cutter assembly 44 located between block 32c and the next adjacent block 32d. Laminate 24 and laminate segments 42 are retained in place on the outer periphery of drum 28 by applying a vacuum through means (not shown) to the interior thereof.

In operation, the prior art machine 20 operates as follows. After a laminate 24 has been fed, adhesive side up, to the outer periphery of drum 28, drum 28 is indexed in the clockwise direction and cutter 44 is actuated to produce a laminate section 42. Drum 28 is indexed again until a laminate segment is moved to a bottom position. Then plate 22 is moved upwardly into contact with a drum 28. This movement produces planar face to planar face contact in a stamping or press-type engagement so that the laminate section on the bottom of the drum is transferred from the drum to plate 22. Plate 22 is then returned back to its previous position, drum 22 indexed at 1/6 turn, and another plate 22 is conveyed into the operative position while the completed plate 22 is being conveyed therefrom.

A machine 20 of the type depicted in FIG. 1 can affix approximately twenty-four laminate segments 42 onto corresponding plates 22 per minute.

With reference to FIG. 2, a urine identification card or plate 22 is shown in greater detail. Urine is injected at an entrance 46 and conveyed to a plurality of chemical test sites 48 by a network of channels 50. Fluid integrity is provided by applying a laminate segment 42 to each side of plate 22.

Figure 3:
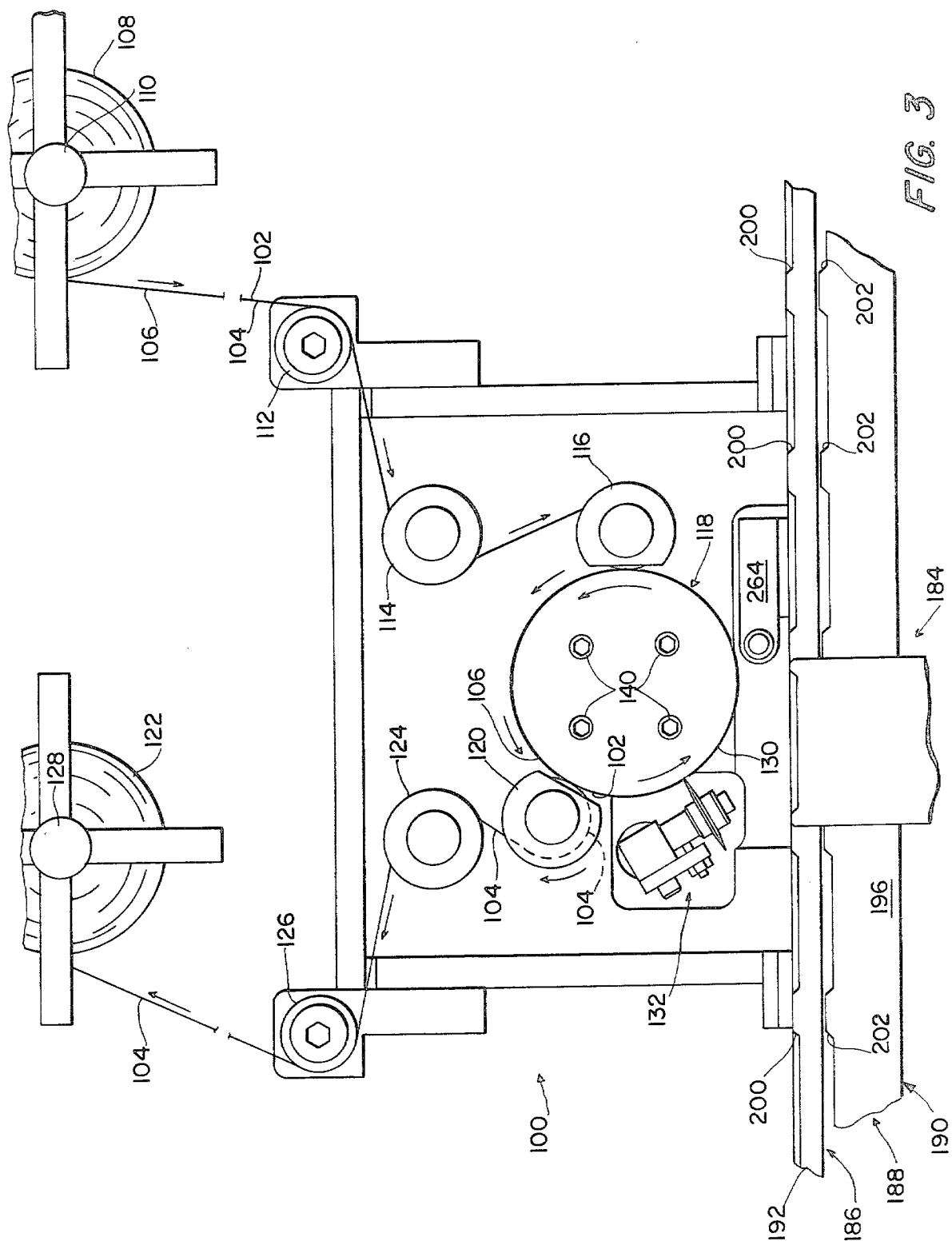
FIG. 3 is a scaled front elevational view with parts removed of an adhesive laminate-applying, walking beam machine according to one embodiment of the present invention.
Figure 4:
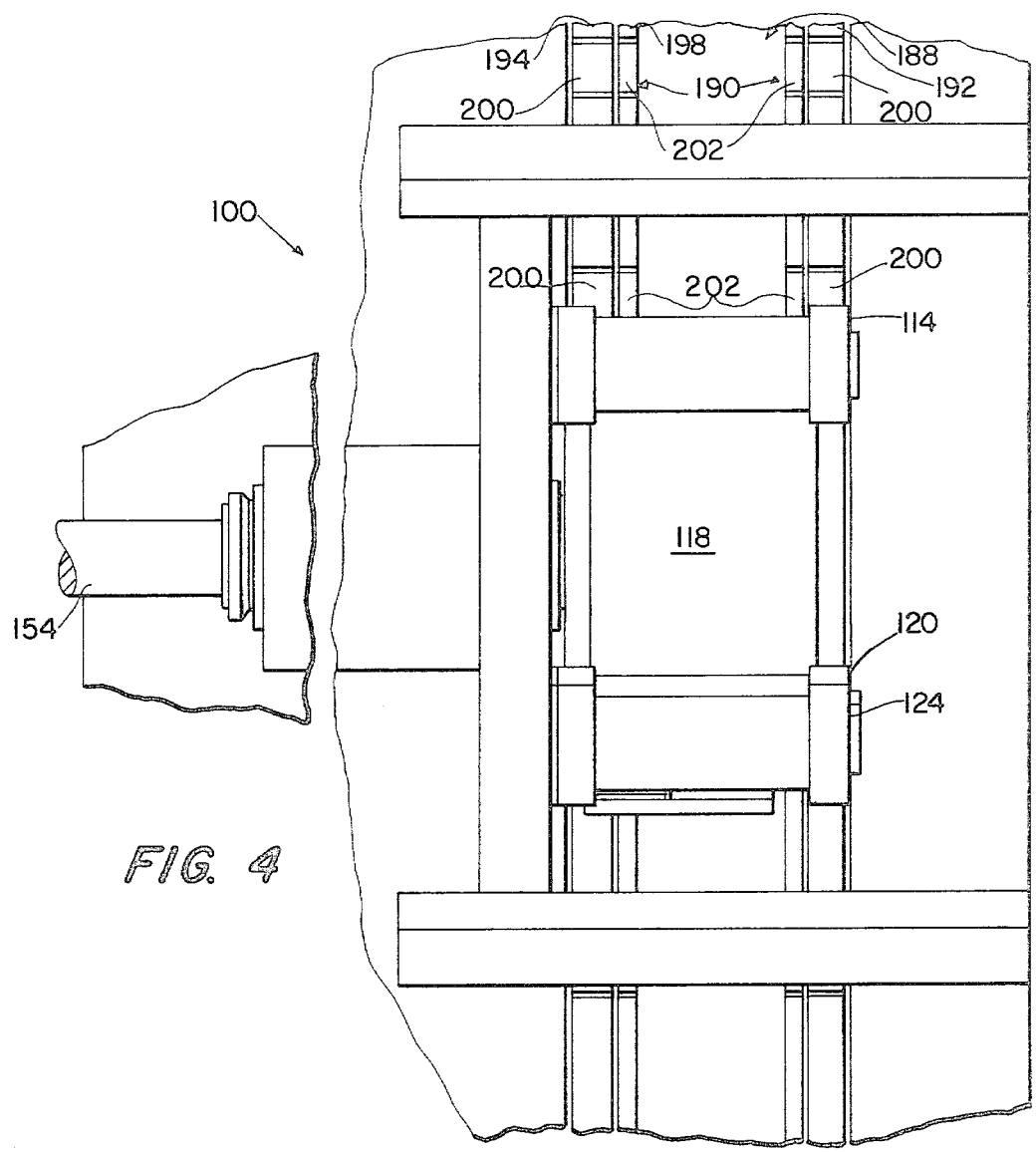
FIG. 4 is a scaled top plan view, with parts removed of the walking beam part of the machine depicted in FIG. 3.

With reference now to FIGS. 3-10, where like numerals refer to like elements in the several views, a laminate applying machine in accordance with a presently preferred embodiment of the invention is denoted 100. With particular reference to FIGS. 3 and 4, machine 100 uses a commercially available, adhesive laminate 102 that is mounted onto an easily removable backing web 104. Adhesive laminate 102 and backing web 104 are made available as a tape 106 wound onto a supply reel 108.

In machine 100, supply reel 108 is mounted onto a feed spindle 110 that is being driven through a magnetic clutch (not shown) by a continuously rotating motor (also not shown). Tape 106 is fed around a plurality of guide rollers 112, 114, and 116 to an intermittently rotatable tape drum 118. Drum 118 rotates in a counterclockwise direction and tape 106 is fed around the top thereof to a separating roller 120. At separating roller 120, backing web 104 is fed around roller 120, whereas adhesive laminate 102 is fed around the periphery of tape drum 118. Backing web 104 is conveyed onto a take up reel 122 through a plurality of guide rollers, such as guide rollers 124 and 126. Take up reel 122 is mounted on a take up spindle 128 which is also driven through a magnetic clutch (not shown) by a continuously operating motor (also not shown). In a preferred embodiment, a single motor drives both take up spindle 128 and feed spindle 110. Finally, adhesive laminate 102 is cut at a cutting station into a laminate segement 130 by a reciprocally driven cutter assembly 132.

Figure 5:
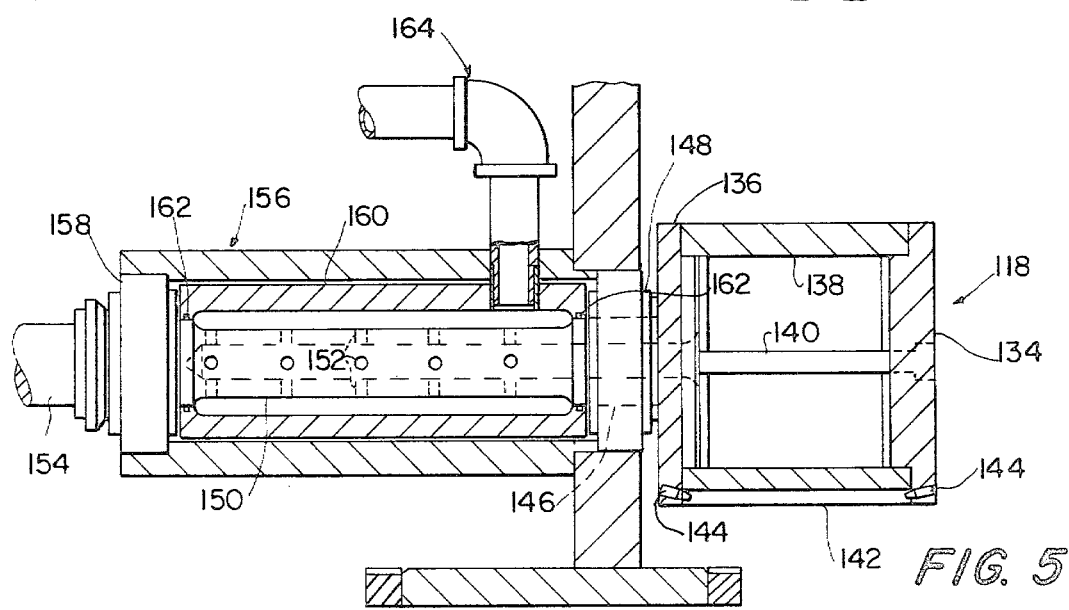
FIG. 5 is a scaled cross-sectional, elevational view of the tape drum system depicted in FIG. 3.

Tape drum 118 is shown in greater detail in FIG. 5. Drum 118 is comprised of an outer end cap 134, an inner end cap 136 and a hollow cylinder 138 sandwiched between end caps 134 and 136. Four bolts 140 (see also FIG. 3) extending from outer end cap 134 and threaded into corresponding threaded holes in inner end cap 136 keep tape drum 118 together. The close tolerances between the end caps and cylinder 138 provide for an airtight joint.

Cylinder 138 is comprised of a porous material, such as sintered stainless steel. Six hardened metal strips 142 (only one of which is shown) are embedded in the outer periphery of cylinder 138 and are retained in place with screws 144 recessed in end caps 134 and 136. The outer edge of strips 142 is preferably even with the outer edge of cylinder 138 so as to present a smooth surface to tape 106.

Inner end cap 136 has a central, hollow hub 146 that is rotatably mounted in a forward bearing 148. A hollow sleeve 150 having a plurality of holes 152 drilled therethrough is connected between hub 146 and a drive shaft 154. Drive shaft 154, in turn, is driven by a motor through a conventional segment gear coupling (both not shown) so as to rotate drive shaft 154, sleeve 150, and tape drum 118 one-sixth of a turn for each rotation of the motor shaft.

An outer housing 156 surrounds sleeve 150 and extends from forward bearing 148 to a rearward bearing 158. Mounted inside outer housing 156 coaxially between outer housing 156 and sleeve 150 is a stationary annular vacuum housing 160. O-ring seals 162 provide a fluid tight seal between sleeve 150 and vacuum housing 160. Vacuum is applied to vacuum housing 160 through a pipe fitting 164. Therefore, it can be seen that while drum 118 is rotatably driven through shaft 154, sleeve 150, and hub 146, a vacuum can still be applied to the interior of drum 118 through pipe fitting 164, which communicates to the interior of vacuum housing 160, through holes 152 and into the interior of sleeve 150 and finally through a bore in hub 146.

Figure 6:
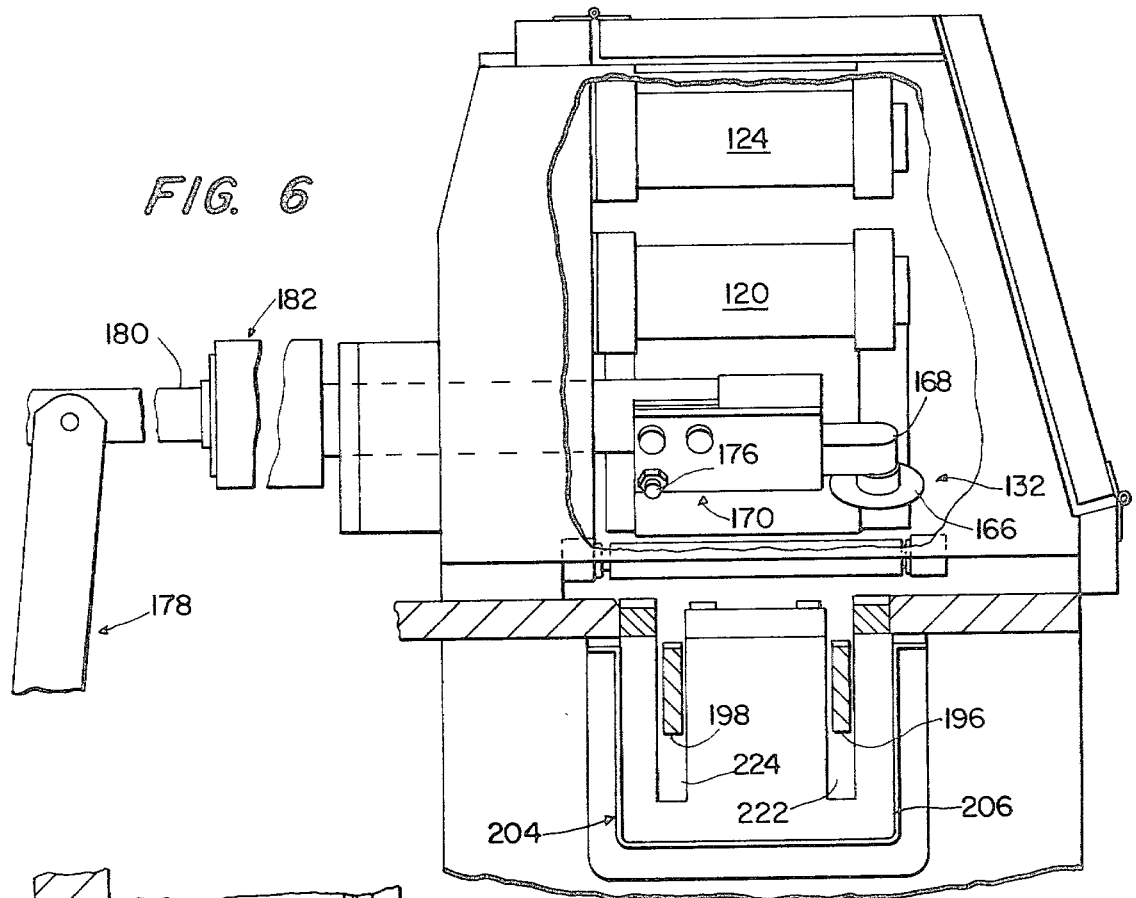
FIG. 6 is a scaled side elevational view, partly in cross section and with some parts removed of the cutter assembly and of part of the platform assembly depicted in FIG. 3.
Figure 6A:
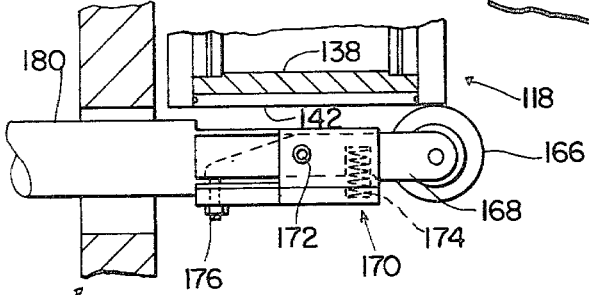
FIG. 6A is a scaled, side elevational view, enlarged and partly in cross-section, and with some parts removed, of the cutter depicted in FIG. 6.

With reference now to FIGS. 6 and 6A, cutter assembly 132 is shown in greater detail. Cutter assembly 132 includes a cutting wheel 166 rotatably mounted at the end of a caster arm 168. Caster arm 168, in turn, is pivotably mounted inside an arm housing 170 by a shaft 172. A coil spring 174 resiliently mounts caster arm 168 in arm housing 170 an a set screw 176 in engagement with the rearward end of caster arm 168 sets the position of cutting wheel 166. As shown in FIG. 6A, the rotation of tape drum 118 is synchronized with the positioning of cutter assembly 132 so that cutting wheel 166 engages one of the six hardened strips 142. Obviously, the peripheral spacing between strips 142 determines the size of laminate segment 130 and together determine the circumference of tape drum 118.

Cutter assembly 132 is reciprocally driven to make a cut in each direction of travel by a cam and cam follower assembly 178 through a connecting shaft 180. A spring assembly 182 (not shown in detail) is mounted around shaft 180 so as to provide a resilient movement for shaft 180 and hence cutter assembly 132.

An endless column of plates 22 is intermittently conveyed to an operating station 184 by a walking beam conveyor 186 depicted in FIGS. 3, 4, and 6. In general, walking beam conveyor 186 comprises a walking beam assembly 188 and a walking beam moving means for generating movement in a generally parallelogram path such that the movement when viewed in front elevation comprises in sequence an upward movement, a forward movement, a downward movement, and a rearward movement. Walking beam assembly 188 comprises an articulately moving walking beam 190 centrally located and movable between two parallel, spaced apart, stationary rails 192 and 194 rigidly secured to the frame of machine 100. Rails 192 and 194 extend horizontally in the longitudinal direction. Walking beam 190 is itself comprised of two, spaced apart bars 196 and 198 mounted on their sides. As can be seen in FIG. 3, both rails 192 and 194 and walking beam bars 196 and 198 are provided with a plurality of longitudinally spaced, vertical lugs 200 and 202, respectively. Lugs 200 and 202 are spaced apart so as to provide recesses therebetween having a length substantially equal to the length of plate 22. In this way, plate 22 when being conveyed can still be accurately positioned and retained.

The walking beam moving means is a conventional assembly and is disclosed and thoroughly described in the Crowley et al U.S. Pat. No. 4,073,373 issued Feb. 14, 1978 and incorporated herein by reference. (See FIG. 11 and the discussion thereof in column 9).

Figure 7:
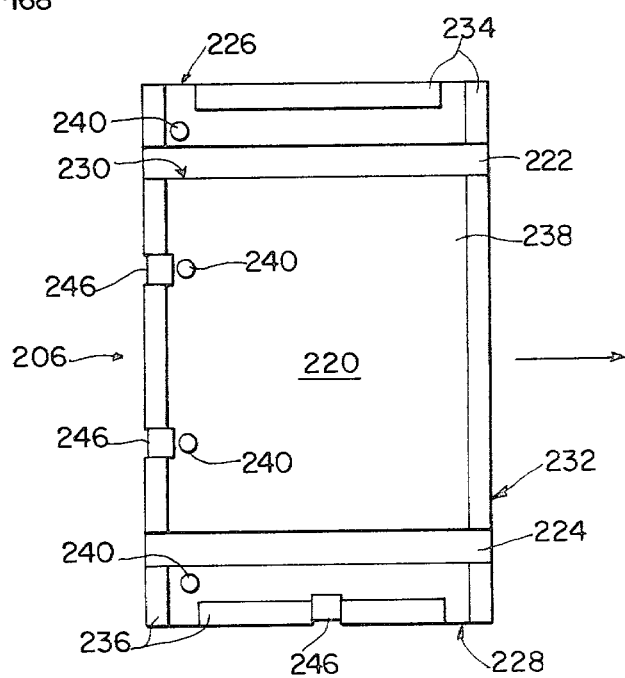
FIG. 7 is a plan view of the vertically movable platform of the platform assembly depicted in FIG. 6.
Figure 8:
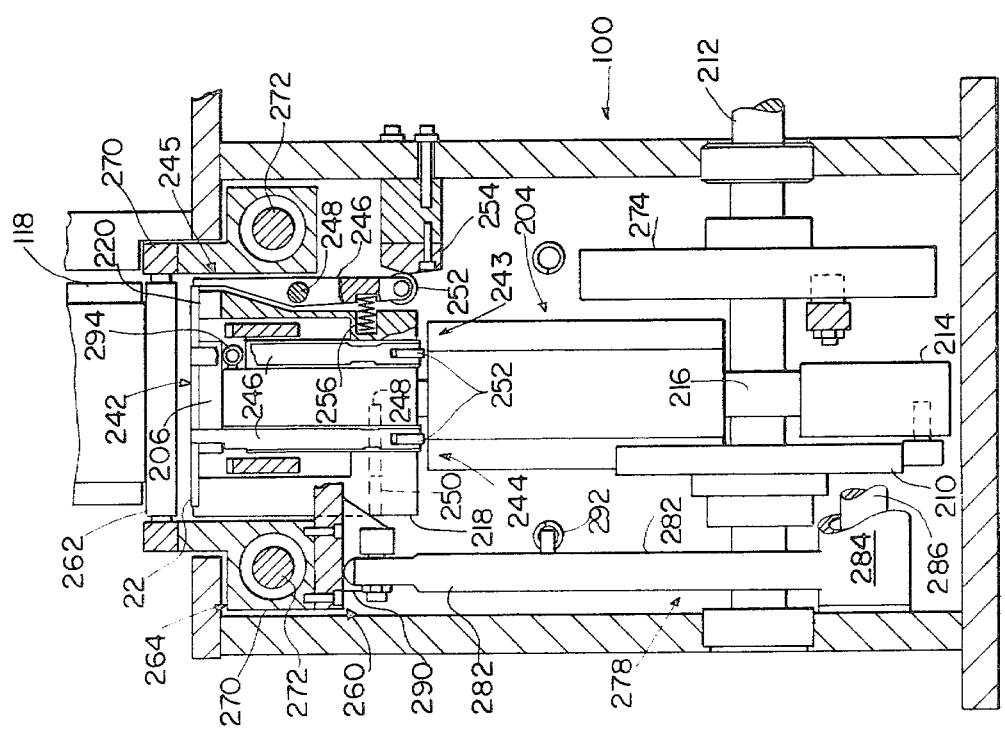
FIG. 8 is a scaled, cross-sectional and elevational view of the roller and the plate clamping assemblies, and of the cam assembly for vertically moving the platform assembly.

Operating station 184, as mentioned above, is located directly below tape drum 118, but also extends rearwardly thereof as clearly shown in FIG. 3. Located at operating station 184 as shown in FIGS. 6, 7 and 8, is a platform assembly 204. Platform assembly 204 comprises a vertically movable platform 206 and a platform moving assembly 208 for positioning platform 206 in a plurality of vertical positions (FIG. 8). The lowest vertical position is the receiving position whereby a plate is transferred from walking beam 190 onto platform 206. The highest position is a tape adhering position whereby a plate on platform 206 can contact a laminate segment 130 on tape drum 18. The third vertical position is located intermediate the other two positions and is the roller receiving position whereby a roller means (described hereinbelow) can engage a plate 22.

With particular reference to FIG. 8, platform moving assembly 208 comprises a cam 210 mounted on a main drive shaft 212 and a cam follower 214. When cam 210 rotates, cam follower 214 causes intermittent vertical movement of platform 206 through a coupling shaft 216.

Platform 206 can best be seen in FIGS. 7 and 8. Platform 206 includes a vertical body 218 and a horizontal top 220. Two vertical slots 222 and 224 extend through platform body 218 and top 220, dividing the latter into two end sections 226 and 228 and a central section 230. Slots 222 and 224 respectively accommodate walking beam bars 196 and 198 so that walking beam 190 can move vertically when platform 206 is stationary, on the one hand, and platform 206 can move vertically when walking beam 190 is stationary on the other hand (see FIG. 6).

As seen in FIG. 7, platform 206 also comprises an annular frame 232 having a first pair of adjacent sides 234 and a second pair of adjacent sides 236 that together define a central receiving surface 238 for receiving a plate 22. Frame 232 accurately positions plate 22 on the top of platform 206. Four rubber cushions 240 are rigidly attached along the rearward portion of the platform top 220 spaced slightly from frame 232. Rubber cushions 240 can be adhesively attached to top 220 and mount plate 22 at a slight angle. In one particular embodiment, cushions 240 are one-eighth of an inch in diameter and have a height of from 35 to 40 thousandth of an inch. In this way, rubber cushions 240 permit a rocking or pitching motion of a plate 22 when contact is made with tape drum 118. The rocking motion ensures that there is not a line contact between plate 22 and laminate segment 130, but rather a small area of contact. Alternatively, a slight pitching motion of plate 22 can be obtained by having a slightly resilient tape drum 118. Obviously, however, rubber cushions 240 are a much less expensive and more simplistic approach.

Figure 9:
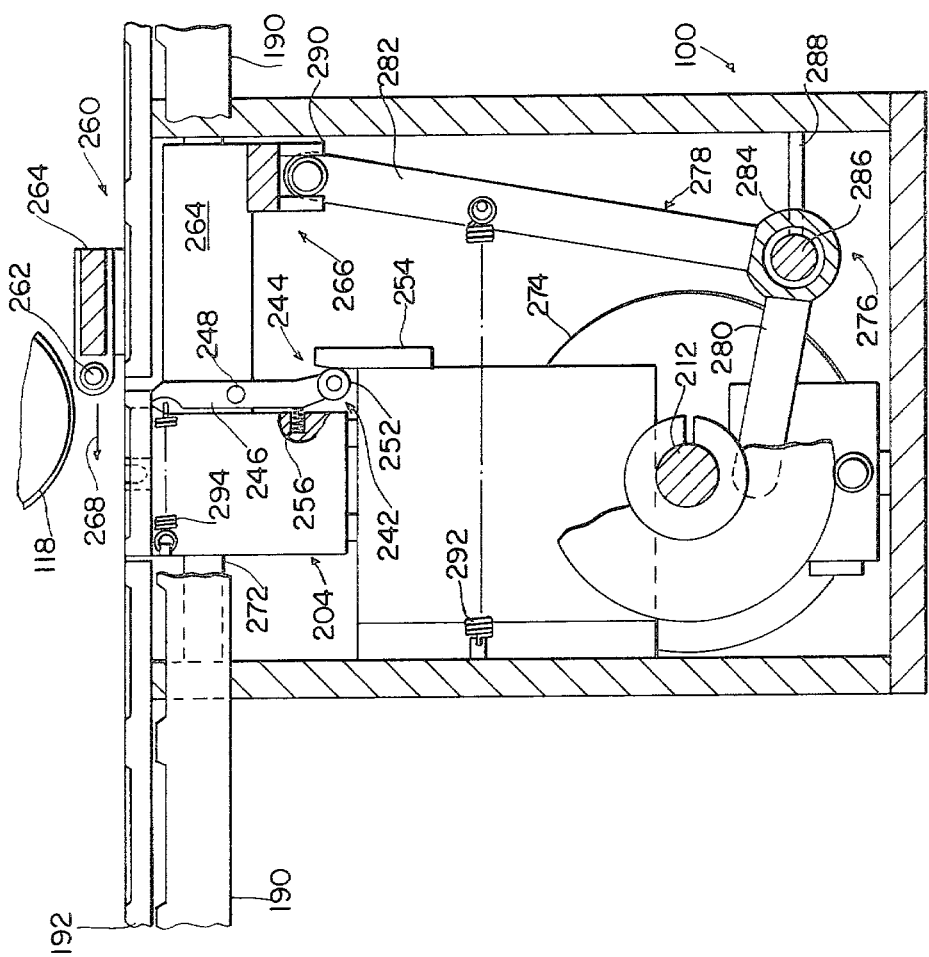
FIG. 9 is a scaled, cross-sectional front elevational view of the roller assembly and of the plate clamping assembly depicted in FIG. 8.

In order to removably, rigidly mount a plate on platform 206, a plate clamping assembly 242 is provided as depicted in FIGS. 7, 8 and 9. Plate clamping assembly 242 is comprised of three substantially similar, cam actuated lever subassemblies 243, 244 and 245, mounted in the second pair of frame sides 236 (see FIG. 7). When actuated, as described hereinbelow, the three lever subassemblies 244 force a plate mounted on platform top 220 into a fit, securing engagement with the first pair of frame sides 234.

Each lever subassembly 243, 244 or 245 is comprised of a vertical lever arm 246 pivotably mounted about a pivot pin 248, that is in turn retained inside a bore 250 in platform body 218. The upper end of lever arm 246 has a reduced width and thickness and is received in recesses in platform body 218 and in frame 232 (see FIG. 7). The lower end of lever arm 246 is provided with a rotatably mounted cam follower roller 252. A cam plate 254 is either mounted to the frame of machine 100, as for lever subassembly 245 (see FIG. 8) or is mounted to some other appropriate stationary housing structure, as for lever subassemblies 243 and 244 (see FIG. 9). Cam roller 252 is kept into resilient contact with cam plate 254 with a spring means such as spring 256 located between pivot pin 248 and roller 252. Thus, it can be seen that lever subassemblies 243, 244 and 245 become disengaged from the corresponding cam plate 254 whenever platform 206 is raised out of the lowest, plate receiving position. Springs 256 force the lower end of the corresponding lever arm 246 outwardly and the upward ends thereof inwardly into engagement with a previously positioned plate 22.

With particular reference now to FIGS. 8 and 9, a roller assembly 260 is depicted for engaging a laminate that has been applied at one end thereof to a plate for rolling the laminate from the engaged end thereof onto the plate during a relative movement therebetween. Roller assembly 260 comprises a roller 262 rotatably mounted in a roller housing 264 and a housing mounting assembly 266 for providing reciprocal movement of roller housing 264 in the direction of an arrow 268 in coordination with the vertical movement of platform 206.

Roller housing 264 comprises two vertical sides 270 each slidably mounted on a corresponding, stationary slide bar 272. Roller 262 is mounted between the upstanding portions of sides 270.

Roller mounting assembly 266 is comprised of a cam 274 mounted on main shaft 212 and a cam follower 276. Cam follower 276, in turn, is comprised of an L-shaped arm 278 having a lower, shorter base member 280 and a longer, upwardly extending vertical member 282 joined to base member 280 at an apex 284. Cam follower 276 is pivotably mounted at apex 284 to a stationary mounting bar 286 which, in turn, is mounted through a support member 288 to the frame of machine 100. A pin (not shown) at the distal end of cam follower base member 280 rides inside a slot (also not shown) in cam 274. The distal end of cam follower vertical member 282 is pivotally attached to roller housing 264 at a yoke 290. An elongate coil spring 292 connected between the frame of machine 100 and a middle portion of cam follower vertical member 283 and a second elongate coil spring 294 connected between the rearward edge of roller housing 264 and a stationary portion of machine 100 ensure that roller 262 is positively urged across platform 206 when rolling a laminate segment onto a plate.

Figure 10A:
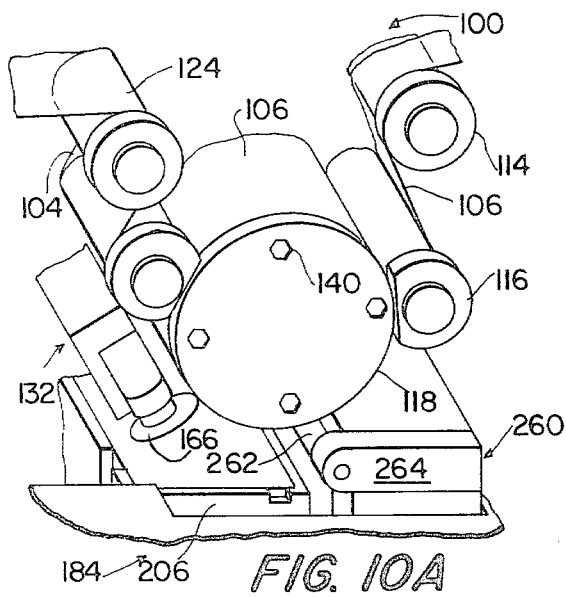
FIGS. 10A through 10F are schematic drawings, similar to FIG. 3, depicting the interrelationships between the various components during the operation of the present machine.

The operation of laminate applying machine 100 can best be seen with reference to FIGS. 10A-10F wherein machine 100 is schematically depicted at various times during the cycle of operation thereof. In FIG. 10A, laminate applying machine 100 is depicted in the position immediately after tape drum 118 has indexed one-sixth of a turn and before cutter assembly 132 has been actuated to cut the adhesive laminate to provide a new laminate segment 130 at the bottom of drum 118. Platform 206 is in the lowest, plate receiving position and has just had a plate deposited on the top thereof by walking beam conveyor 186 (not shown in FIG. 10A). Roller assembly 260 is in the retracted position and out of the way of platform 206.

Figure 10B:
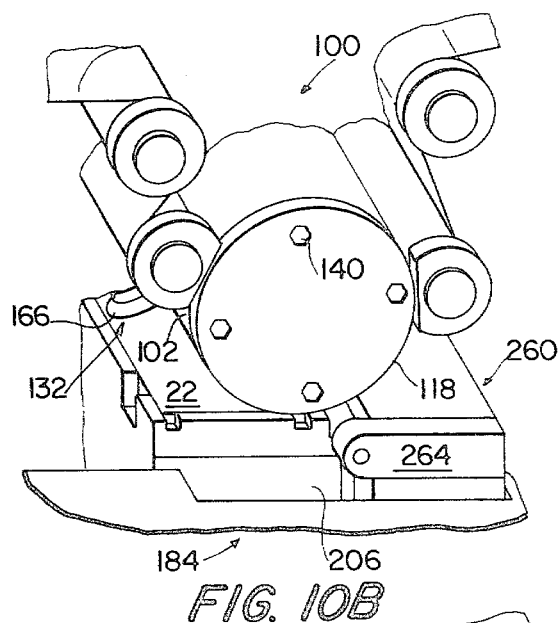

In FIG. 10B, platform 206 has been moved vertically to its second, tape adhering position. Cutter assembly 132 has been previously retracted to its inward position. As cutting wheel 166 travelled across hardened strip 142 in the peripheral side of drum 118, cutting wheel 166 was resiliently forced against strip 142 thereby cutting the previously fed adhesive laminate 102. As platform 206 left its first, lowered position, the three lever subassemblies 243, 244 and 245 were resiliently forced into contact with plate 22, thereby urging plate 22 against the first pair of frame sides 234. Platform 206, in the position depicted in FIG. 10B, has forced the upper, trailing edge of plate 22 into contact with the leading edge of a cut laminate segment 130. As platform 206 reaches its uppermost position, plate 22 rocks or pitches slightly as cushions 240 are compressed. Thus, an area of contact is made between laminate segment 130 and plate 22 thereby ensuring a more positive attachment therebetween. As mentioned above, laminate segment 130 is adhered in a conforming, convex shape to the outer periphery of drum 118. Because laminate segment 130 has its adhesive side facing outwardly, as soon as contact is made with plate 22, the end of the laminate segment will adhere to the end of the plate 22.

Figure 10C:
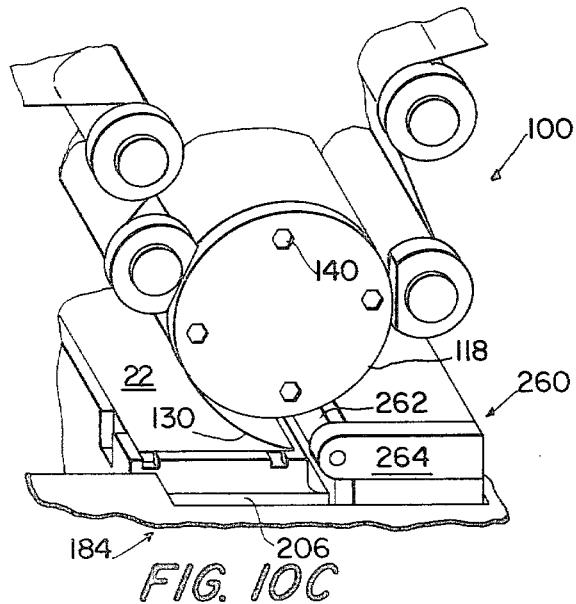

When platform 206 begins its downward travel to its intermediate, roller receiving position, as shown in FIG. 10C, the leading end of laminate segment 130 will be pulled off of the periphery of drum 118 in a gradual, peeling motion. By removing the laminate segment in this manner, the trailing end thereof is still adhering to the surface of drum 118 and the laminate segment is maintained in a taut condition.

Figure 10D:
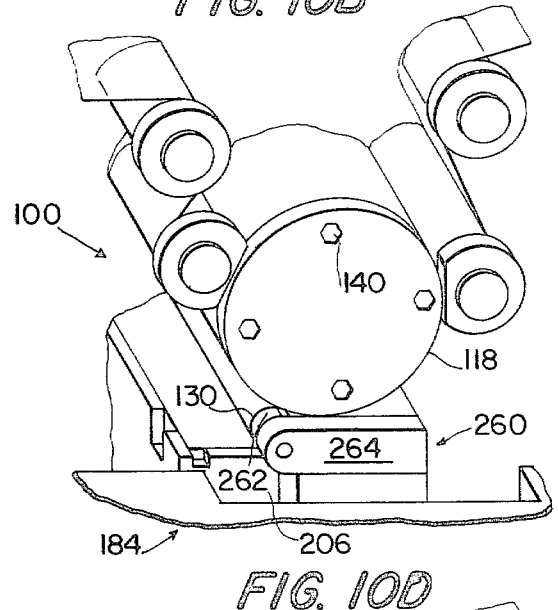

As roller 262 travels across the face of plate 22, as shown in FIG. 10D, it contacts the non-adhesive side of laminate segment 130, and gradually pulls it from the periphery of drum 118 as it is rolled into adhering contact with the top of plate 22. Furthermore, as a result of the rolling action, the air is gradually forced out and cannot become trapped as frequently happened in the prior art device, discussed above with respect to FIG. 1.

Figure 10E:
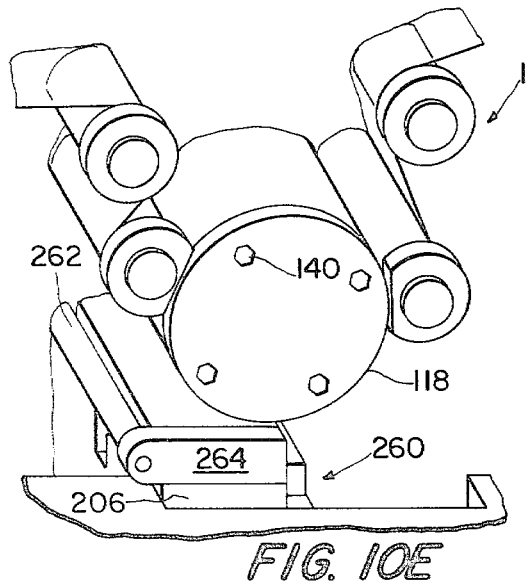
Figure 10F:
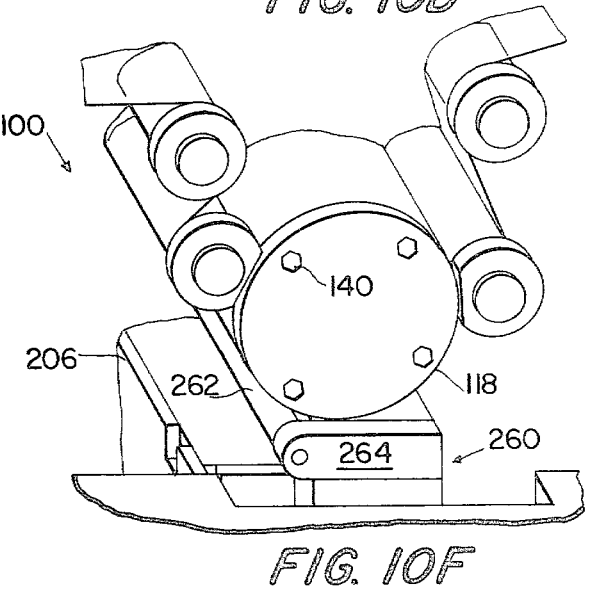

Just as roller 262 completes the application of laminate segment 130 onto plate 22, drum 118 begins to rotate to the next position, as shown in FIG. 10E. During the return stroke of roller assembly 260, drum 118 completes its rotation and platform 206 is lowered to the first, plate receiving position, as shown in FIG. 10F. Also, while roller assembly 260 is returning to its initial position, walking beam conveyor 186 is conveying the laminated plate 22 away from the operating station 184 and conveying another plate thereto.

The present invention has been described with respect to one presently preferred embodiment thereof. The present invention is capable of laminating up to 45 plates per minute, almost twice as fast as the described prior art device, and produces a laminated product that is free from wrinkles or trapped air bubbles. The present invention is all mechanical and wipes the tape on with a roller while the tape is still being held through a vacuum onto the tape drum, thereby ensuring a greater accuracy in the application of the laminate and also permitting faster operation. By the use of the sintered drum, the tape is held by the vacuum at every point, which further enables a more accurate positioning. The present invention also permits the tape to be picked up at only one end by the plate in a tangential contact therewith so that only the end of the tape is pulled from the drum as the platform returns to the intermediate, roller receiving position.

Other variations of the present invention include providing a stationary roller, contacting the laminate with the leading edge of the plate instead of the trailing edge of the plate, and then conveying the laminate and plate to the stationary roller with the walking beam apparatus. This embodiment of the invention has the advantages of eliminating the entire roller assembly 260 and the complexities associated therewith. In addition, less power is required and a faster operation can be achieved since there is no need to wait for the movement of the roller assembly 260.

Although the invention has been described in detail with respect to exemplary embodiments thereof, it will be understood by those of ordinary skill in the art that variations and modifications may be effected within the scope and spirit of the invention.

We claim:

1. In a machine for applying an adhesive laminate to a plate that includes a rotatable drum means having a means for applying a vacuum so as to retain a laminate on the outer periphery thereof, a means for supplying the laminate to the periphery of the drum means, adhesive side outward, and a means for positioning a plate in contact with a laminate on the drum so as to effect a transfer of the laminate to the plate, the improvement wherein:

said drum means comprises a cylindrical drum whereby a laminate on the periphery thereof can assume the arcuate contour of the outer periphery of said drum; and said positioning means comprises a movable platform, and means for moving said platform so as to contact a laminate on said drum solely with an end of an upper side of a plate on said platform along a tangential area of the laminate;

said improvement further comprising roller means for engaging the laminate and the plate and for rolling the laminate from the one end thereof onto the plate during a relative movement therebetween.

2. In a machine as claimed in claim 1, the improvement wherein said cylindrical drum includes a circular wall comprised of a porous material, non-porous end cap means in sealing engagement with said wall, and means for connecting the interior of said drum with the vacuum means such that a laminate is uniformly retained along the entire surface thereof to the outer periphery of said drum by a vacuum when applied to the interior of said drum.

3. In a machine as claimed in claim 2 wherein said porous material of said circular wall is a sintered metal.

4. In a machine as claimed in claim 2 wherein said laminate supplying means supplies a laminate in an elongate strip, the improvement wherein said drum further includes axial strips of a hardened material mounted at the periphery thereof and axially extending an operational length of said drum, wherein an operational length is at least equal to the transverse length of a laminate that is retained on said drum, said strips being spaced apart a circumferential distance equal to the predetermined longitudinal length of a laminate section to be applied to a plate;

said improvement further including cutter means comprising a cutter wheel and means for mounting said wheel for reciprocal motion that includes engagement with a properly positioned axial strip for cutting a laminate strip into a laminate section.

5. In a machine as claimed in claim 1 wherein said roller means comprises a roller housing, a roller rotatably mounted in said housing and means for moving said roller housing at predetermined times in coordination with said movable platform so as to engage and roll the laminate on the plate.

6. In a machine as claimed in claim 5 wherein said roller housing moving means is further for reciprocally moving said roller into rolling engagement with a laminate and plate while said plate is supported on said platform, and wherein said platform moving means positions said platform having a plate onto which a laminate has been transferred at a height after said transfer such that said roller can engage the laminate and plate.

7. In a machine as claimed in claim 1 wherein said platform moving means is for moving said platform in a substantially vertical direction and said platform is located vertically below said drum and spaced horizontally therefrom a distance such that only the end of a plate on said platform contacts a laminate on said drum.

8. In a machine as claimed in claim 7 and further includes a means for automatically conveying a plate onto and away from the plate positioning means, wherein said platform moving means is for positioning said platform between a plurality of vertical positions, a first, lowest position for receiving a plate from the plate conveying means, a second highest position for contacting a plate on said platform with a laminate on said drum, and a third, intermediate vertical position for permitting said engagement of said roller means with the laminate and the plate.

9. In a machine as claimed in claim 8 wherein said plate conveying means comprises a walking beam assembly that includes a pair of parallel, spaced apart, elongated, stationary rails, a movable walking beam comprised of a pair of spaced apart elongated beam members for engaging a plate along the sides thereof, and means for providing generally a parallelogram movement of said walking beam, and wherein said platform is located between said rails and includes vertical slots for correspondingly receiving and permitting movement of said beam members, said slots having a depth so as to permit relative movement between said platform and said beam members.

10. In a machine as claimed in claim 7 further including means for permitting a slight pitching motion of a plate on said platform when the plate is contacting a laminate on said drum such that a band of contact is made between the plate and the laminate.

11. In a machine as claimed in claim 10 wherein said permitting means comprises a resilient cushion mounted on the top side, rearward end of said platform such that the rearward end of a plate rests thereon.

12. In a machine as claimed in claim 1 further including means for removably rigidly mounting a plate on said platform.

13. In a machine as claimed in claim 12 further including means cooperating with said plate mounting means for accurately positioning a plate on the top of said platform.

14. In a machine as claimed in claim 13 wherein said plate positioning means comprises an annular frame rigidly mounted to the top of said platform around the periphery thereof, whereby a plate can be received inside the frame, and wherein the height of said frame is less than the thickness of a plate.

15. In a machine as claimed in claim 14 wherein said frame has at least two pairs of adjacent sides and wherein said plate mounting means comprises at least two engagement means for engaging the edges of a plate located inside said frame, said two engagement means being respectively disposed in corresponding sides of one pair of said frame sides such that when a plate is engaged thereby, the plate is forced into a securing contact with the other of said pair of frame sides whereby the plate is both accurately positioned and rigidly mounted on said platform.

16. In a machine as claimed in claim 15 wherein said engagement means comprises a pivotable lever vertically mounted to a side of said platform, a spring means for urging the upper end of said lever into engagement with a plate, and a cam means for engagement with a stationary portion of said machine such that when said platform is moved toward said drum, said cam means permits the engagement of said lever with a plate.

17. In a machine as claimed in claim 12 wherein said plate mounting means comprises at least two engagement means for respectively engaging different sides of a plate, each said engagement means comprising a pivotable lever vertically mounted to a side of said platform, spring means for urging the upper end of said lever into engagement with a plate, and cam means for engagement with a stationary portion of said machine so that when engaged, said lever upper end is disengaged from a plate;

and wherein said platform moving means is also for moving said platform in a substantially vertical direction between a plurality of vertical positions, a first, lowest position for receiving a plate from the plate conveying means, a second highest position for contacting a plate on said platform with a laminate on said drum, and a third, intermediate vertical position for permitting said engagement of said roller means with the laminate and the plate, whereby said cam means becomes disengaged from said machine stationary portion when said platform is moved out of said first position so as to permit said plate engagement of said upper lever end.

18. A method for applying an adhesive laminate to an elongate plate comprising
feeding an adhesive laminate, adhesive side out, to an operative conforming position on a convex surface,
feeding a plate to an operative position on a movable platform,
moving said platform to position only the upper side of one end of said plate into contact along a tangential area with said laminate; and
rolling said laminate from said contact area to the other end of said plate into adhesive planar contact with said plate.

19. A method as claimed in claim 18 wherein said convex surface is the outer periphery of a porous, rotatable, round drum wall and said method further includes
applying a vacuum to the interior of said drum;
feeding said laminate onto said drum at a first location such that the vacuum causes said laminate to adhere and conform to the outer periphery of said drum; and
rotating said drum until said fed laminate is in said operative position.

20. A method as claimed in claim 19, said method further including resiliently engaging the plate with said laminate so as to cause a slight pitching of the plate with a resultant larger area of contact therebetween.

* * * * *